Jan. 9, 1962     T. P. MOONEY     3,016,156
SERVICE CAR
Filed Sept. 9, 1959     5 Sheets-Sheet 2
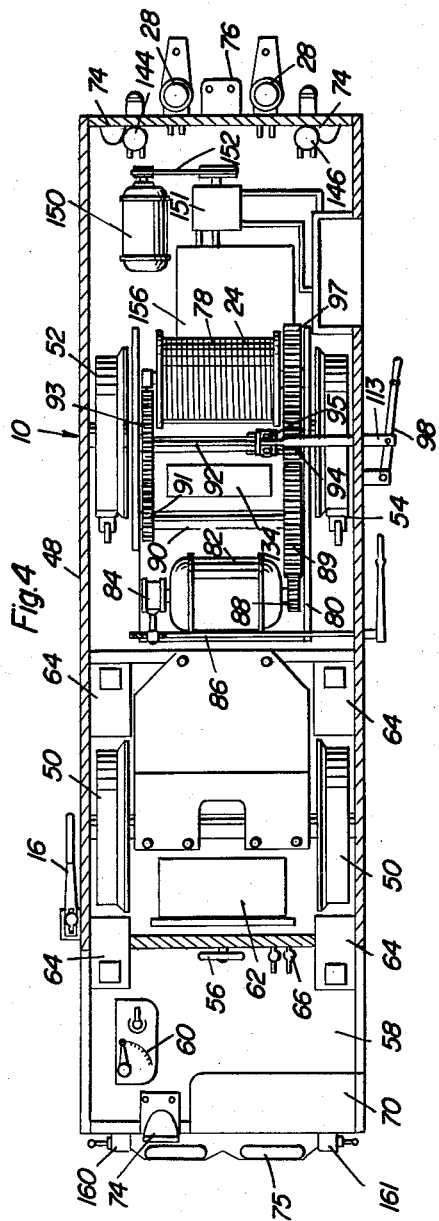
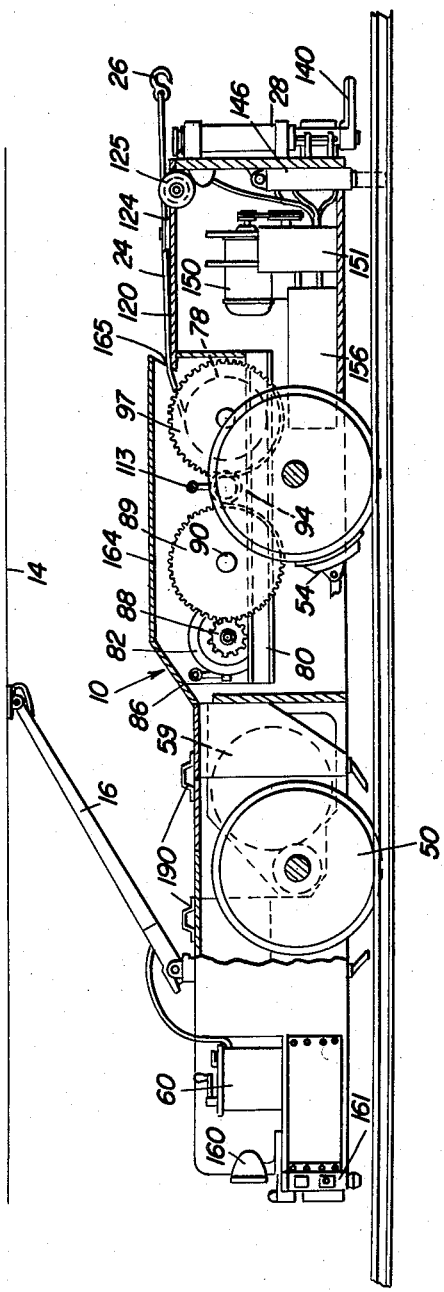
Truman P. Mooney
INVENTOR.

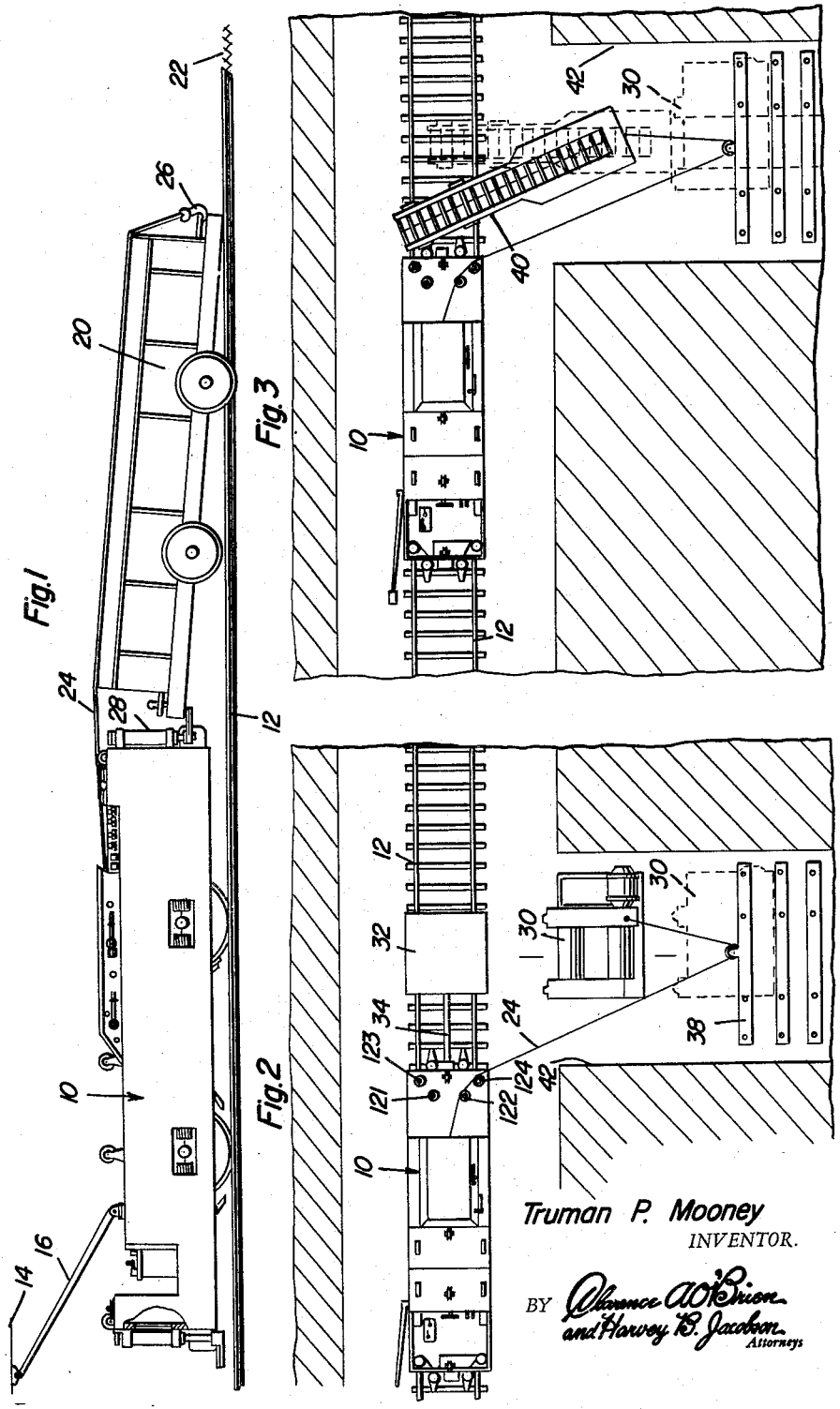

Jan. 9, 1962    T. P. MOONEY    3,016,156
SERVICE CAR
Filed Sept. 9, 1959    5 Sheets-Sheet 3

Truman P. Mooney
INVENTOR.

Jan. 9, 1962 T. P. MOONEY 3,016,156
SERVICE CAR
Filed Sept. 9, 1959 5 Sheets-Sheet 4
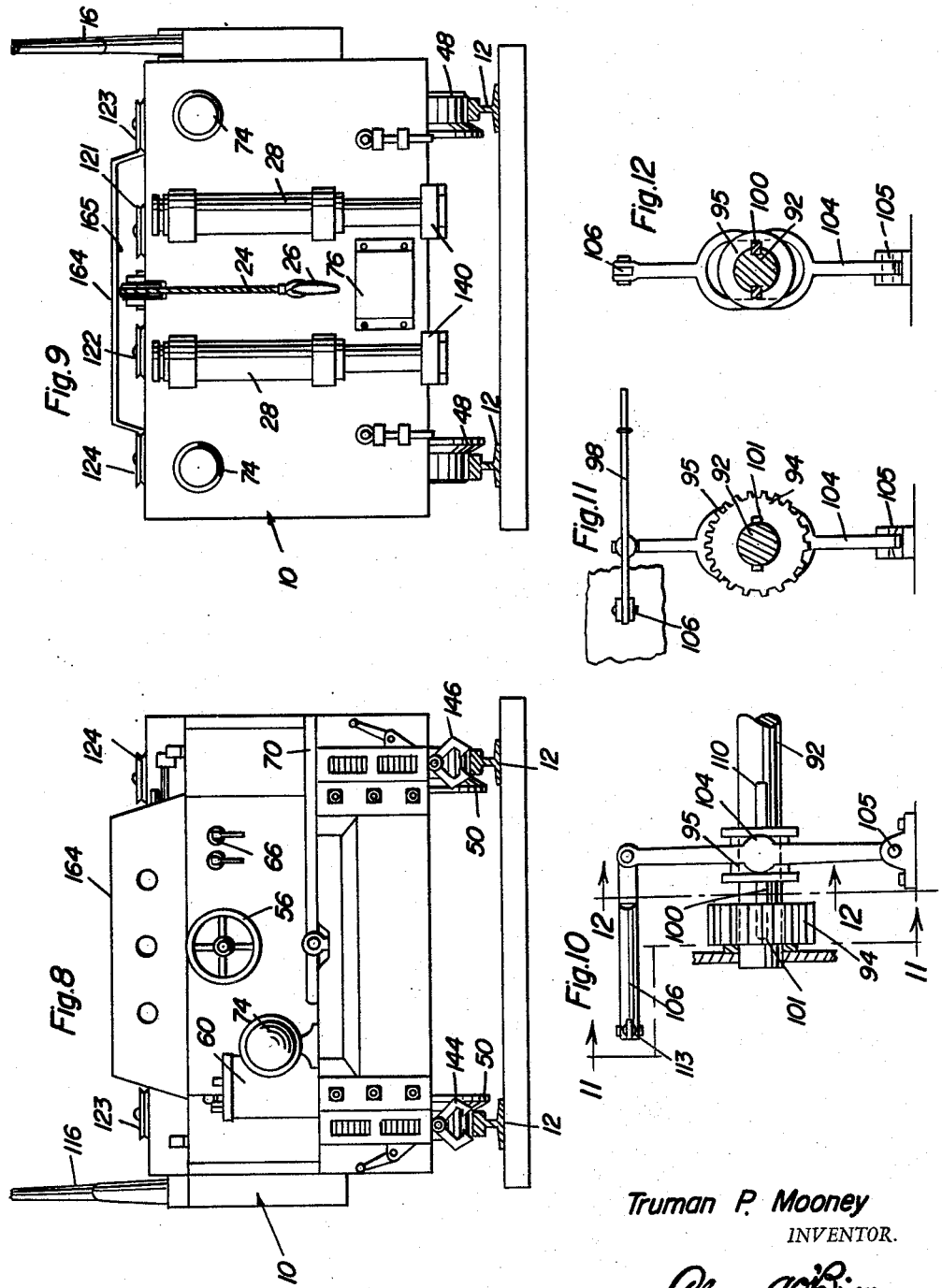
Truman P. Mooney
INVENTOR.

Jan. 9, 1962  T. P. MOONEY  3,016,156
SERVICE CAR
Filed Sept. 9, 1959  5 Sheets-Sheet 5
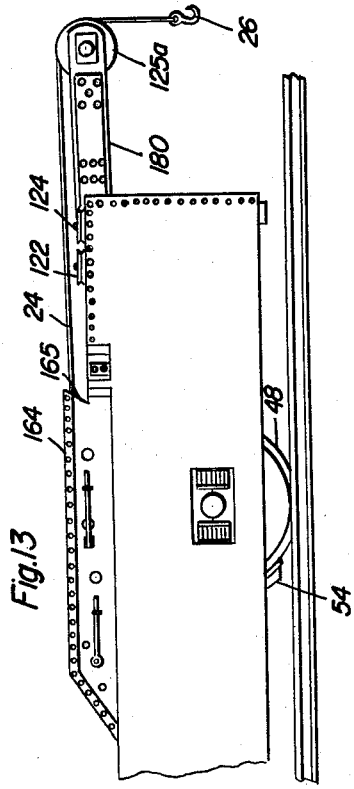
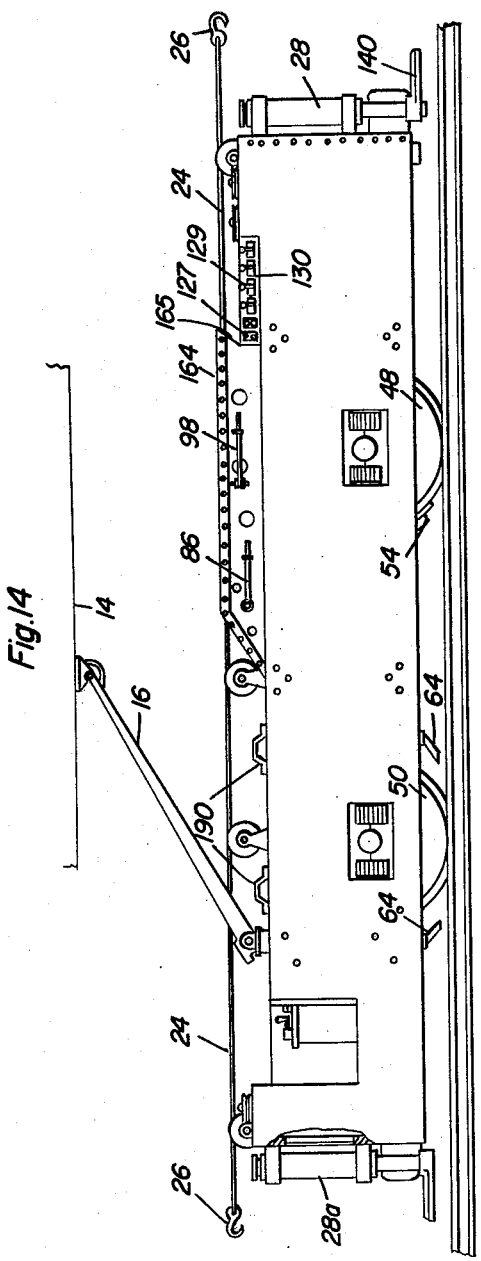
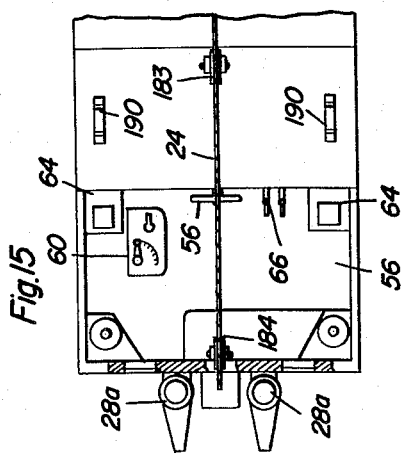
Truman P. Mooney
INVENTOR.
BY Clarence A. O'Brien
and Harvey B. Jacobson
Attorneys

United States Patent Office 3,016,156
Patented Jan. 9, 1962

3,016,156
SERVICE CAR
Truman P. Mooney, Box 95, Kopperston, W. Va.
Filed Sept. 9, 1959, Ser. No. 838,875
11 Claims. (Cl. 214—152)

This invention relates to a multipurpose service car and more particularly to a vehicle to perform various jobs underground.

An object of the invention is to provide a vehicle providing service underground, as in mining operations, to materially facilitate the labor and effort in setting equipment, overcoming accidents and performing various other functions.

A further object of the invention is to provide a service car which, by virtue of the structural arrangement, supplies a much more versatile vehicle than has, to my knowledge, ever been contemplated.

Briefly, a vehicle in accordance with the invention is electrically operative and equipped with a number of units and accessories which permit solution to numerous problems peculiar to underground mining operations. The nature of the invention is such that it is embodied in a novel structural arrangement interrelating a number of independently old components, providing a practical vehicle of the nature to be described.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a largely diagrammatic side elevational view showing a vehicle in accordance with the invention, used to move a coal mine car over a broken section of track.

FIGURE 2 is a diagrammatic top view showing the service car being used to set a conveyor belt head.

FIGURE 3 is a diagrammatic top view showing the service car employed to locate a loading elevator.

FIGURE 4 is a top sectional view showing the service car.

FIGURE 5 is a side view of the service car in FIGURE 4, parts being broken away to illustrate in section certain details.

FIGURE 8 is a front end view of the service car.

FIGURE 9 is a rear end view of the service car.

FIGURE 10 is a fragmentary view showing a clutch detail.

FIGURE 11 is a sectional view taken on the line 11—11 of FIGURE 10.

FIGURE 12 is a sectional view taken on the line 12—12 of FIGURE 10.

FIGURE 13 is a fragmentary elevational view showing a modification of the service car differing in that a boom is supplied.

FIGURE 14 is a side elevational view of the service car.

FIGURE 15 is a fragmentary top view, parts broken away in section, of the front portion of the service car.

Figure 6:
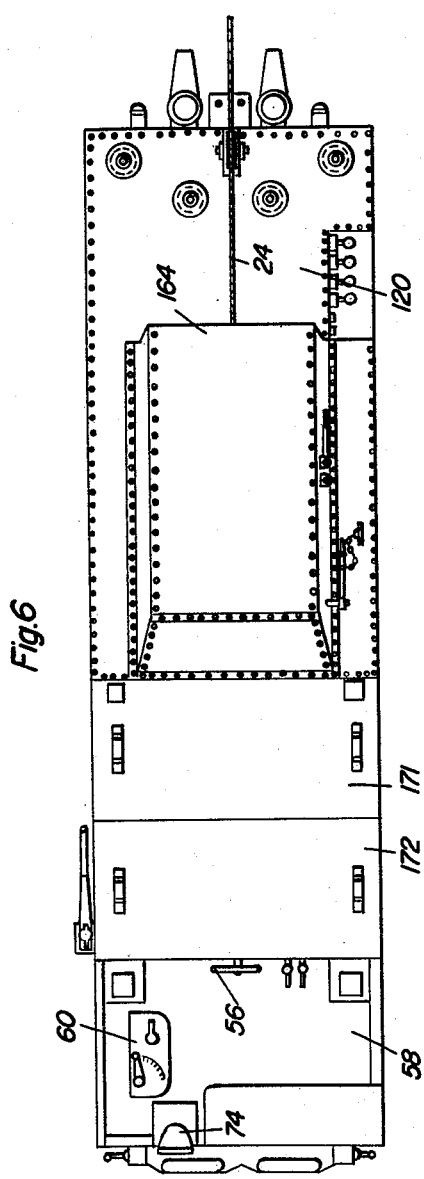
FIGURE 6 is a top view of the service car.

In the accompanying drawings reference is first made to FIGURES 1-3. Due to space limitations only three operational capabilities of service car 10 are illustrated. FIGURE 1 shows service car 10 on track 12 and operated from an overhead conductor 14 with which trolley 16 is engaged. The service car is in the process of moving a coal mine car 20 over a broken section 22 of track 12. One way of doing this is to connect wire rope or cable 24 to the rear end of car 20 by using hook 26 at the end of the cable. The front end of the car 20 is elevated by hydraulic jacks 28 at the rear end of car 10. As will be seen later the hydraulic jacks are double acting and they are capable of both lifting and pressing down. Assuming that car 20 is on the far side of the break 22 in track 12, the front end of the car may be lifted first as shown in FIGURE 1, and the car moved over the broken part of track 12. Then the front end may be lowered on a substantial part of track 12 and the rear end of the car lifted by cable 24. Another option would be to lift the entire car by means of the hydraulic jacks 28 and the cable 24. Other possibilities and capabilities will, of course, become readily apparent, and the illustrations in FIGURES 1-3 are definitely non-exclusive of all possibilities.

FIGURE 2 shows car 10 being used to set a conveyor belt head 30. One possible way of doing this is to attach supply skid 32 to the rear end of car 10 by means of a tongue 34. The supply skid contains conveyor belt head 30, and the project is to move the conveyor belt head in the direction of the arrows in FIGURE 2 to the dotted line position. Cable 24 is reeved over pulleys on the top of car 10 and engaged with a pulley or sheave attached to the roof header 38 or roof bolt. By securing cable 24 to the conveyor belt head and applying the brakes to car 10, the conveyor belt head 30 can be withdrawn in the direction of the arrows from supply skid 32 when the cable 24 is payed in at the service car 10.

FIGURE 3 shows essentially the same operation being achieved in essentially the same way. However, the object being moved is a loading elevator 40. It is being moved in place in belt entry 42 in order to operatively connect with conveyor belt head 30 which has been previously placed as shown in FIGURE 2.

Reference is now made to the specific structural makeup of the service car 10. The service car is constructed of an essentially rectangular body 48 built on a substantial chassis and having front wheels 50 and rear wheels 52, at least the rear wheels of which have brakes 54. Four wheel brakes comprise the much more desirable system due to the heavy duty work to which the car is put. The brakes themselves and wheels are conventional equipment and therefore hand wheel 56 shown mounted at forward deck 58 diagrammatically represents the means for operating the brakes. Electric traction motor 59 is located between the axles of the car. Tramming controller 60 is mounted at deck 58 and is wired through trolley 16, the motor resistance 62, to motor 59 which drives the forward wheels 50. Sanders 64 are located fore and aft of wheels 50, and there are sander operating levers 66 at deck 58 and adjacent to seat 70. Lighting is provided by lamps 74, both at the front and back of the car, and there is a heavy duty bumper 75 at the deck 58 end of the car. Drawbar 76 is at the opposite end of the car and, like bumper 75, is securely connected with the frame or chassis of the car.

The previously mentioned cable 24 has its inner end connected to winding drum 78 arranged transversely of the longitudinal axis of car 10 and mounted within a heavy duty frame 80 that is attached to the chassis of the vehicle. The cable and drum constitute a part of a hoist which includes hoist electric motor 82 attached to frame 80 and having a brake 84 on the shaft of the motor. The brake operating lever 86, used to tighten or release brake 84, projects conveniently to a location at the side of the car. Drive pinion 88 is also secured to the shaft of motor 82, and it is in engagement with gear 89. Countershaft 90, mounted in bearings in frame 80, has gear 89 fixed to it, and there is a pinion 91 secured to shaft 90. Clutch shaft 92 is parallel to shaft 90 and has gear 93 thereon in engagement with gear 91, together with a clutch controlled pinion 94. Clutch 95 is engaged with clutch shaft 90 and with the clutch controlled pinion which, in turn, is in engagement with gear 97 fixed to the winding drum 78. Control assembly 98 for the clutch 95, projects to a position on the car which would be convenient for the user e.g. near brake control 86.

FIGURES 10–12 show the details of a typical clutch 95, although it is to be understood that other conventional clutches can be substituted. Clutch 95 is made of a clutch element 100 having pins projectable into holes 101 in the face of pinion 94. The clutch element 100 is slidable axially of shaft 92 by means of yoke 104 which is pivoted as at 105, at one end and which has a link 106 at the opposite ends. There is a keyway 110 in clutch shaft 92, and it contains a key fixed to the clutch control element 100. Pinion 94 is freely rotatable on shaft 92, but becomes fixed to the shaft when the clutch element 100 is engaged therewith so that the clutch exercises its function of coupling and uncoupling pinion 94 with clutch shaft 92. Link 108 has another link 113 pivoted thereto, and control lever 98 is pivotally connected therewith as shown in FIGURES 4 and 11.

Cable 24 extends from winding drum 98 over deck 120 on which there are four idler pulleys arranged in pairs. Idler pulleys 121 and 122 are closer together than the pair of containing pulleys 123 and 124 (FIGURES 2 and 3) and the pair of containing pulleys 123 and 124 is spaced rearwardly of the car 10 providing lateral directional control for cable 24 when used, for example, as shown in FIGURES 2 and 3. The axes of rotation of the four described pulleys are vertical, and there is an additional pulley 125 whose axis of rotation is horizontal. Pulley 125 is recessed in an opening in deck 120 and is located behind the four previously described pulleys to constrain the movement of the cable 24 when it is exercising a longitudinal draft function (FIGURE 1). Hoist motor 82 is controlled by a switch assembly 127 adjacent to the hydraulic controls 129 on console panel 130 at the side of the car. Switch assembly 127 is operatively connected to a source of electrical potential through resistors 134 (FIGURE 4) conveniently located adjacent to motor 82.

Double acting hydraulic jacks 28 have been mentioned previously. These double acting hydraulic jacks 28 are secured to one wall of the car and are capable of exerting a downward force or a lifting force. The longitudinal axes of the hydraulic jacks 28 are vertical, and the feet 140 of each are swingable through an arc of at least 180° by simply turning them. Double acting hydraulic rail lock jacks 144 and 146 are secured to the chassis of the car, and the hydraulic controls at control panel 130 are for the purpose of actuating these hydraulic devices. The hydraulic system includes an electric motor 150 under the control of one of the switches in the switch assembly 127, and a hydraulic pump 151 driven by a transmission, for example a belt transmission 152 (FIGURE 4). Hydraulic flow lines operatively connect the hydraulic control valves 129, hydraulic tank 156, the pump 151, and the hydraulic jacks 28, 144 and 146. The hand operated rail jacks 160 and 161 adjacent to bumper 75, can, if desired, be hydraulic jacks connected operatively with the hydraulic system previously described. The rail lock jacks serve their usual purpose regardless of whether they are hydraulic or manual in their actuation.

Figure 7:
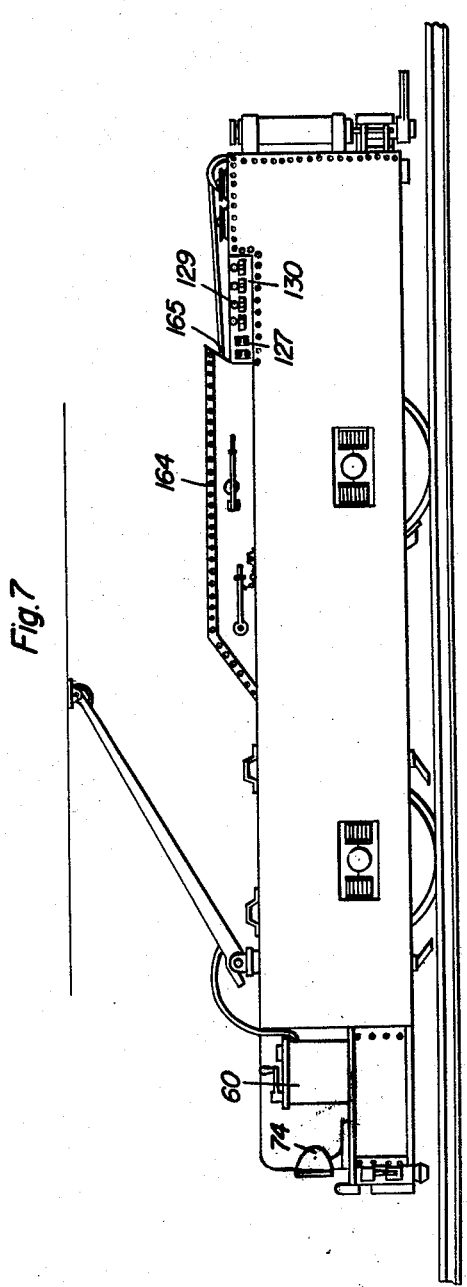
FIGURE 7 is a side view of the service car.

FIGURES 6 and 7 show that it is preferred to have the chassis of the other car covered with deck forming plates. Canopy 164 covers the hoist mechanism, and there is an opening 165 at one end of the canopy above deck 120 through which cable 24 extends. Removable covers 171 and 172 are over the traction motor, resistors 62 and forward axle and wheels 50.

FIGURE 13 shows a modification wherein there is a boom 180 rigidly and firmly secured to the rear part of the car and at an upper level thereof. Pulley 125a is mounted for rotation at the end of this boom and serves the same function as pulley 125. Boom 180 can be used as an accessory i.e., may be attachable in which case pulley 125a will be in addition to pulley 125. FIGURE 15 shows a modification wherein there are forward pulleys 183 and 184 with horizontal axes of rotation. Further, this view discloses hydraulic jacks 28a at the end of the car having deck 56. The purpose of FIGURE 15 is to show that the car 10 may be rearranged to the extent that the cable 24 operates from the front or rear thereof. Provision is easily made for cable 24 in the arrangement shown in FIGURE 15 by having an entrance or opening such as opening 165, at both the front and rear of the canopy 164. Furthermore, FIGURES 13 and 15 illustrate a degree of flexibility and versatility contemplated in that the jacks and arrangement of the cable may be altered to the extent of having jacks both at the front and rear (FIGURE 14) and cables operating at the front and rear at the same time or alternately. Multiple cables can be operated off the same drum 78, but the more practical arrangement would be to have individual drums, one for each cable. Numerous accessories of a practical nature can be applied such as additional flood lights, cable chocks 190 on the decks and/or the sides of the car and which also serve as handgrips. Further, additional drawbars may be applied e.g. at the bumper end of the car.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A method for moving a rail car over a broken section of track by means of a service locomotive having a jack mechanism and cable winch mechanism at one end of the locomotive comprising the steps of moving said one end of the service locomotive up to one side of the broken section of track; moving the adjacent end of the rail car on the opposite side of the broken section up to said one end of the locomotive; raising the adjacent end of the rail car by the jack mechanism on the locomotive and connecting the opposite end of the rail car to the cable winch mechanism to move the rail car over the broken section of track.

2. The method as defined in claim 1 wherein the adjacent end of the rail car is first raised for lifting the front wheels of the rail car off the track and moving the rail car front wheels over the broken section; subsequently lowering the adjacent end and front wheels onto the track and finally raising the opposite end of the rail car and remaining wheels off the track by the cable winch mechanism, moving them over the broken section and then lowering them onto the track.

3. The method as defined in claim 1 wherein both ends of the rail car are simultaneously raised to move the rail car wheels over the broken section of track.

4. A method for moving equipment off track by use of a service locomotive having a cable winch mechanism at one end thereof comprising the steps of: uncoupling the equipment from the locomotive; fixedly anchoring the locomotive on the track; laterally directing the cable from the cable winch mechanism at an angle from the locomotive to a fixed idler pulley and entraining the cable thereabout; connecting the cable to one lateral side of the equipment and drawing the cable into the cable winch mechanism to pull the equipment laterally off the track.

5. A locomotive service car for underground mining handling operations comprising chassis means, jack mechanism mounted at one end of the chassis means and projecting therefrom and cable winch mechanism mounted on said chassis means and including cable means extending above said chassis means and beyond said one end of the chassis means and cable guiding means mounted on top of the chassis means for selectively directing the cable means for performing operations in cooperation with said jack mechanism.

6. The combination as defined in claim 5 wherein said guiding means includes guide pulleys for directing the cable means laterally from the chassis means.

7. The combination of claim 5 wherein said chassis means includes a first pair of wheels and a second pair of wheels, electrical means drivingly connected with said first pair of wheels, and a deck adjacent one end of the chassis means and motor control means at said deck.

8. The combination of claim 7 wherein said cable guiding means includes pulleys to constrain the motion of said cable means, said pulleys including at least one pair of pulleys which are laterally spaced in order to laterally constrain the travel of the cable means.

9. The combination of claim 8 wherein the cable guiding means further includes a deck plate over which the cable is adapted to be drawn and above which said pulleys are mounted, a selectively operable pulley having an essentially horizontal axis of rotation mounted adjacent to the first mentioned pulleys.

10. The combination of claim 9 wherein the jack mechanism includes double acting hydraulic jacks connected to one end of the chassis means, an a hydraulic system for hydraulically energizing said jacks.

11. The combination of claim 10 wherein said double acting jacks are adapted to constitute a lift by which to elevate equipment and cars when moved in one direction and wherein the double acting jacks form ground stops when operated in the downward direction.

References Cited in the file of this patent

UNITED STATES PATENTS

| | | |
|---|---|---|
| 1,751,717 | Romine | Mar. 25, 1930 |
| 1,802,220 | Romine | Apr. 21, 1931 |
| 2,430,962 | Stamler | Nov. 18, 1947 |
| 2,606,745 | Ball et al. | Aug. 12, 1952 |